(12) United States Patent
Miyazaki (10) Patent No.: US 9,393,844 B2
(45) Date of Patent: Jul. 19, 2016

(54) TIRE MOLD

(71) Applicant: TOYO TIRE & RUBBER CO., LTD., Osaka-shi, Osaka (JP)

(72) Inventor: Tetsuji Miyazaki, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 331 days.

(21) Appl. No.: 13/929,259

(22) Filed: Jun. 27, 2013

(65) Prior Publication Data
US 2014/0096883 A1 Apr. 10, 2014

(30) Foreign Application Priority Data

Oct. 10, 2012 (JP) ................................. 2012-225275

(51) Int. Cl.
*B29D 30/06* (2006.01)
*B60C 13/02* (2006.01)
*B29D 30/72* (2006.01)

(52) U.S. Cl.
CPC ............ *B60C 13/02* (2013.01); *B29D 30/0601* (2013.01); *B29D 30/0605* (2013.01); *B29D 30/0606* (2013.01); *B29D 30/72* (2013.01); *B29D 2030/0612* (2013.01); *B29D 2030/0616* (2013.01)

(58) Field of Classification Search
CPC .................. B29D 30/0606; B29D 2030/0612; B29D 2030/0616
See application file for complete search history.

(56) References Cited

U.S. PATENT DOCUMENTS

| 5,303,758 | A | * | 4/1994 | Clementz | ............... B60C 13/001 152/523 |
| 5,645,661 | A | * | 7/1997 | Clementz | ................ B60C 13/02 152/523 |
| 6,253,815 | B1 | * | 7/2001 | Kemp | ....................... B44F 1/02 152/209.19 |
| 6,955,782 | B1 | * | 10/2005 | Ratliff, Jr. | .......... B29D 30/0629 264/326 |
| 8,381,786 | B2 | | 2/2013 | Ebiko et al. | |

(Continued)

FOREIGN PATENT DOCUMENTS

JP 2003-320818 A 11/2003
JP 2004-17828 A 1/2004

(Continued)

OTHER PUBLICATIONS

The guide at the press release distributed to journalits at Tire Technology Center of Toyo Tire & Rubber Co., Ltd, Jun. 27, 2012 (2 pages).

(Continued)

Primary Examiner — James Mackey
(74) Attorney, Agent, or Firm — Westerman, Hattori, Daniels & Adrian, LLP (57) ABSTRACT

A tire mold is provided with a groove-like saw cut in an area of a tire molding surface which comes into contact with a side surface of a tire. The saw cut comprises a pair of circumferential saw cuts arranged to be spaced in a tire diametrical direction, a grid-like saw cut which is expanded between the pair of circumferential saw cuts, and a plurality of frame-like saw cuts which are dotted between the pair of circumferential saw cuts. The frame-like saw cuts fringe a closed area which is wider than a smooth area defined by the grid-like saw cut. The grid-like saw cut surrounds the frame-like saw cuts to prevent the frame-like saw cuts from coming into contact with each other. The frame-like saw cuts are coupled to each other via the grid-like saw cut.

5 Claims, 8 Drawing Sheets

(56) References Cited

U.S. PATENT DOCUMENTS

| | | | |
|---|---|---|---|
| 2008/0066846 A1* | 3/2008 | Metz | B60C 13/001 |
| | | | 152/523 |
| 2010/0000648 A1 | 1/2010 | Nakano | |
| 2010/0000649 A1 | 1/2010 | Iwabuchi | |
| 2012/0055603 A1 | 3/2012 | Tokizaki | |
| 2012/0118466 A1 | 5/2012 | Ebiko et al. | |
| 2012/0273101 A1 | 11/2012 | Iwabuchi | |

FOREIGN PATENT DOCUMENTS

| | | | |
|---|---|---|---|
| JP | 2008-1353 A | 1/2008 |
| JP | 2008-137541 A | 6/2008 |
| JP | 2011-37388 A | 2/2011 |
| JP | 2011-126335 A | 6/2011 |
| JP | 2012-56416 A | 3/2012 |
| JP | 2012-106583 A | 6/2012 |

OTHER PUBLICATIONS

Toyo Tires, "Launching of Nanoenergy 0", Web URL: http://www.toyo-rubber.co.jp/news/press.html, Jun. 27, 2012 (2 pages).
Sanei-Shobo Publishing Co., Ltd, "Car Goods Magazine", vol. 140, Issue No. 9, Jul. 17, 2012 (1 page).
Naigai Publishing Co., Ltd., "Monthly Priviate Car", Issue No. 9, Aug. 1, 2012 (1 page).
Yaesu Publishing Co. Ltd., "Driver", Issue No. 11, Sep. 24, 2012 (1 page).
Sanei-Shobo, "All of the Hybrid and Eco-Car in 2013 (Motor Fan separate volume overall series vol. 42)", Sep. 26, 2012 (1 page).
Office Action dated Mar. 24, 2016, issued in counterpart Japanese Patent Application No. 2012-225275, with English Translation. (7 pages).

* cited by examiner

Fig. 9A comparative
example

Fig. 9B comparative
example

TIRE MOLD

BACKGROUND OF THE INVENTION

1. Field of the Invention

The present invention relates to a tire mold for cure molding a tire, a manufacturing method of a pneumatic tire by using the tire mold, and a pneumatic tire.

2. Description of the Related Art

In cure molding of a tire, a tread surface and a side surface of an uncured tire are pressed to a tire molding surface of a tire mold, and a heating operation and a pressurizing operation are applied to the uncured tire. At this time, if an air lying between the tire molding surface and the tire creates an air accumulation without being appropriately discharged, a notch-like recess is formed on an outer surface of the tire due to the air accumulation. The recess is recognized as an area which is peeled or depressed along a tire circumferential direction, and is particularly significantly created in the side surface.

Generally, a vent hole serving as an exhaust hole is provided in an area of the tire molding surface which comes into contact with the side surface of the tire. However, if a lot of vent holes are arranged, the number of rubber projections called as spews is increased in correspondence to the vent holes, and there is a risk that an outer appearance of the tire is damaged by cut traces of the spews. Accordingly, it is not practical to increase the number of the vent holes for a countermeasure of the air accumulation.

Figure 10:
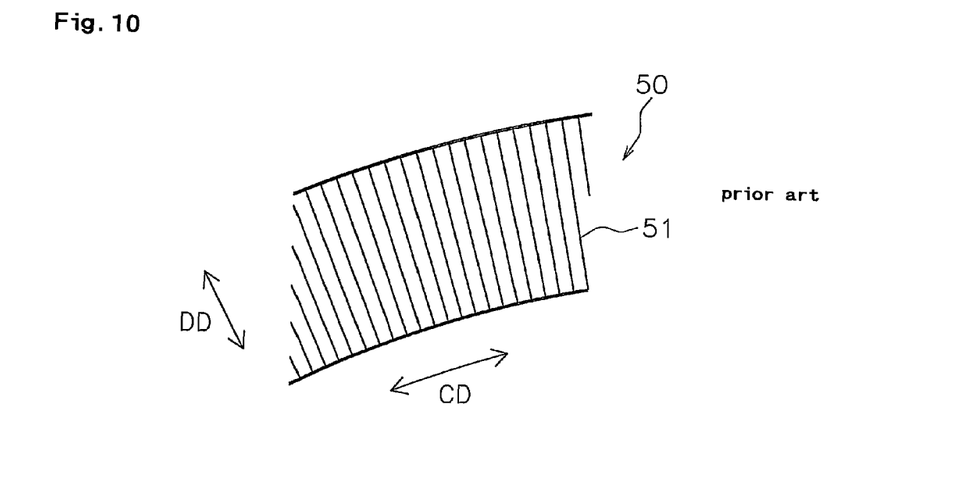
FIG. 10 is a view showing conventional saw cuts.
Figure 11:
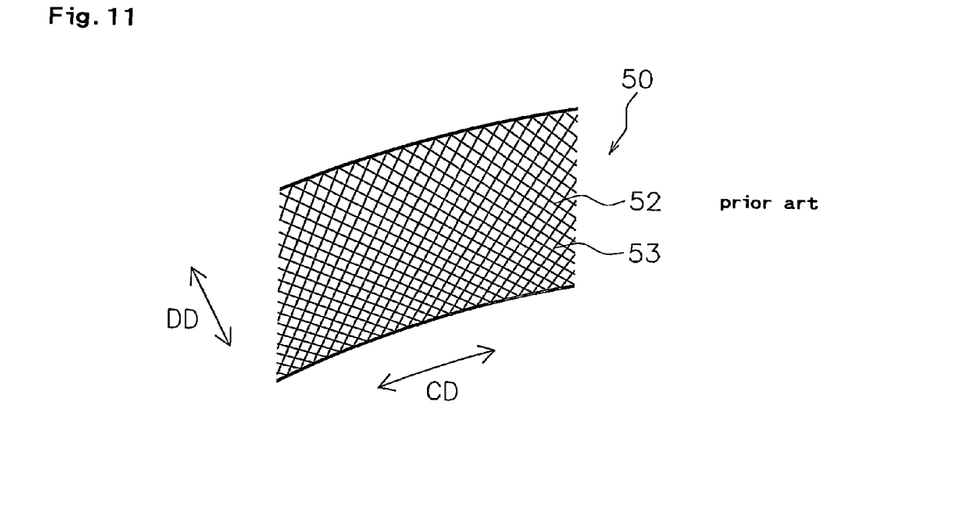
FIG. 11 is a view showing conventional saw cuts.

On the contrary, as shown in FIG. 10, there can be thought a structure in which groove-like saw cuts 51 are provided in an area 50 of a tire molding surface which comes into contact with a side surface of a tire, and the saw cuts are used as a flow channel for the air so as to enhance an exhaust efficiency. FIG. 10 shows an example in which the saw cuts 51 extending in a tire diametrical direction are arranged in a tire circumferential direction CD, and FIG. 11 shows an example in which saw cuts 52 inclined in relation to a tire diametrical direction, and saw cuts 53 intersecting the saw cuts 52 are arranged. However, there is a case that the air accumulation is still created, and it is known that there is room for improvement.

According to the knowledge of the inventor of the present invention, it has been known that the rubber flows into the area 50 of the tire molding surface from both an outside direction and an inside direction in the tire diametrical direction, and the air accumulation tends to be created at a confluence position thereof. Particularly, in FIG. 10, the rubber tends to flow in the tire diametrical direction, and the air accumulation accordingly tends to be created. Further, in FIG. 11, although the rubber flowing direction is dispersed, the saw cut pattern is uniform and a rubber motion flow is uniform. Therefore, there has been a case that the air accumulation is still formed at the confluence position.

Each of Patent Documents 1-5 describes a tire which is provided with projection-like ridges on a side surface, and it is assumed that saw cuts corresponding to the respective ridges are provided on a tire molding surface of a tire mold for cure molding the tire. However, the tire molds do not suggest any means for solving the creation of the air accumulation mentioned above.

PRIOR ART DOCUMENTS

Patent Document 1: Japanese Unexamined Patent Publication No. 2004-17828
Patent Document 2: Japanese Unexamined Patent Publication No. 2008-137541
Patent Document 3: Japanese Unexamined Patent Publication No. 2011-37388
Patent Document 4: Japanese Unexamined Patent Publication No. 2011-126335
Patent Document 5: Japanese Unexamined Patent Publication No. 2012-106583

SUMMARY OF THE INVENTION

The present invention is made by taking the actual condition mentioned above into consideration, and an object of the present invention is to provide a tire mold which can inhibit a recess from being formed on an outer surface of a tire while preventing an air accumulation from being created, a manufacturing method of a pneumatic tire which uses the tire mold, and a pneumatic tire.

The object can be achieved by the following present invention. The present invention provides a tire mold provided with a groove-like saw cut in an area of a tire molding surface which comes into contact with a side surface of a tire. The saw cut comprises a pair of circumferential saw cuts which extend in a tire circumferential direction and are arranged so as to be spaced in a tire diametrical direction, a grid-like saw cut which is constructed by a combination of saw cuts arranged in directions intersecting with each other and is expanded like a grid between the pair of circumferential saw cuts, and a plurality of frame-like saw cuts which are dotted between the pair of circumferential saw cuts and fringe a closed area which is wider than a smooth area defined by the grid-like saw cut. The grid-like saw cut surrounds the frame-like saw cuts in such a manner as to prevent the frame-like saw cuts from coming into contact with each other, and the frame-like saw cuts are coupled to each other via the grid-like saw cut.

In the tire molding surface of the tire mold, since grid-like saw cuts expanding between the pair of circumferential saw cuts are provided in an area which comes into contact with a side surface of the tire, the rubber flowing direction is dispersed in comparison with the saw cut pattern as shown in FIG. 10. Further, since a plurality of frame-like saw cuts are dotted between the pair of circumferential saw cuts, the rubber tends to be stagnant locally in each of closed areas, and the rubber flow is not uniform. Further, since the frame-like saw cuts do not come into contact with each other, the frame-like saw cuts do not form an obstacle to an expansion of the rubber over the tire molding surface. As a result, it is possible to prevent the air accumulation from being created by dispersing the air lying between the tire molding surface and the side surface of the tire, and it is possible to inhibit the recess from being formed on the side surface of the tire which is cure molded by using the mold.

In the pneumatic tire in accordance with the present invention, it is preferable that the frame-like saw cuts are coupled to the other plurality of frame-like saw cuts by the grid-like saw cut, and a length of a line segment of the grid-like saw cut coupling the frame-like saw cuts is between once and triple a length in a longitudinal direction of the line segment of the closed area surrounded by the frame-like saw cuts. Accordingly, since a lot of frame-like saw cuts are dotted at appropriate intervals so as to apply a sufficient change to the rubber flow, it is possible to well prevent the air accumulation from being created by efficiently dispersing the air.

In the pneumatic tire in accordance with the present invention, it is preferable that a surface shape of the frame-like saw cut is formed as a polygonal shape having four or more sides or a circular shape. Accordingly, the flowing direction of the rubber which passes through the closed area can be easily dispersed, and the creation of the air accumulation can be effectively prevented.

In the pneumatic tire in accordance with the present invention, it is preferable that the closed area becomes smaller or larger toward a position closer to an inner side in the tire diametrical direction. In this case, a preferable change can be applied to the flow of the rubber without deteriorating the fluidity of the rubber so much, by arranging the comparatively wide closed area in the side where the side surface of the tire is pressed to the tire molding surface in advance.

The present invention provides a manufacturing method of a pneumatic tire comprising a step of carrying out cure molding by setting an uncured tire to the tire mold mentioned above, and pressing the side surface of the tire to the tire molding surface of the tire mold. According to the method, it is possible to inhibit the recess from being formed on the side surface of the vulcanization molded tire, while preventing the air accumulation from being created by the saw cuts as mentioned above which are provided on the tire molding surface of the tire mold.

The present invention provides a pneumatic tire provided with a projection-like ridge in a side surface. The ridge comprises a pair of circumferential ridges which extend in a tire circumferential direction and are arranged so as to be spaced in a tire diametrical direction, a grid-like ridge which is constructed by a combination of ridges arranged in directions intersecting with each other and is expanded like a grid between the pair of circumferential ridges, and a plurality of frame-like ridges which are dotted between the pair of circumferential ridges and fringe a closed area which is wider than a smooth area defined by the grid-like ridge. The grid-like ridge surrounds the frame-like ridges in such a manner as to prevent the frame-like ridges from coming into contact with each other, and the frame-like ridges are coupled to each other via the grid-like ridge. Since the saw cuts corresponding to the ridges as mentioned above are provided on the tire molding surface of the tire mold to which the side surface of the tire is pressed, the creation of the air accumulation can be prevented as mentioned above at a time of the cure molding, and the formation of the recess on the side surface of the tire can be suppressed.

DETAILED DESCRIPTION OF THE PREFERRED EMBODIMENTS

An embodiment of the present invention will be explained with reference to the drawings.

Figure 1:
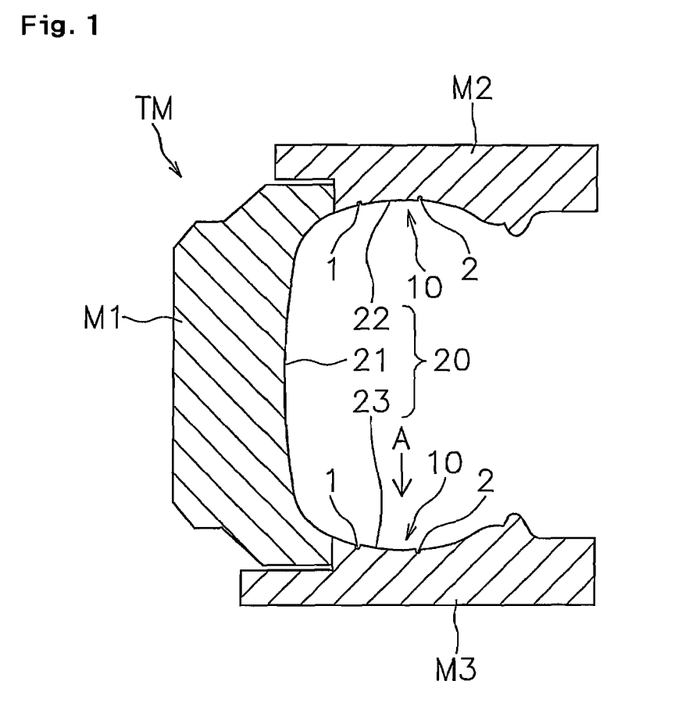
FIG. 1 is a cross sectional view schematically showing an example of tire mold according to the present invention.

FIG. 1 shows a schematic cross sectional view of a tire mold TM (hereinafter, referred to as mold TM) serving as a tire curing metal mold. At a time of cure molding, an uncured tire (not shown) is set to the mold TM while setting a tire axial direction up and down. The mold TM is provided with a tread mold portion M1 which molds a tread portion of the tire, and side mold portions M2 and M3 which mold side wall portions of the tire, and a tire molding surface 20 is constructed by inner surfaces 21 to 23 of the respective mold portions. Although not being illustrated, a concavo-convex shape corresponding to a tread pattern is formed in the inner surface 21 of the tread mold portion M1.

Figure 2:
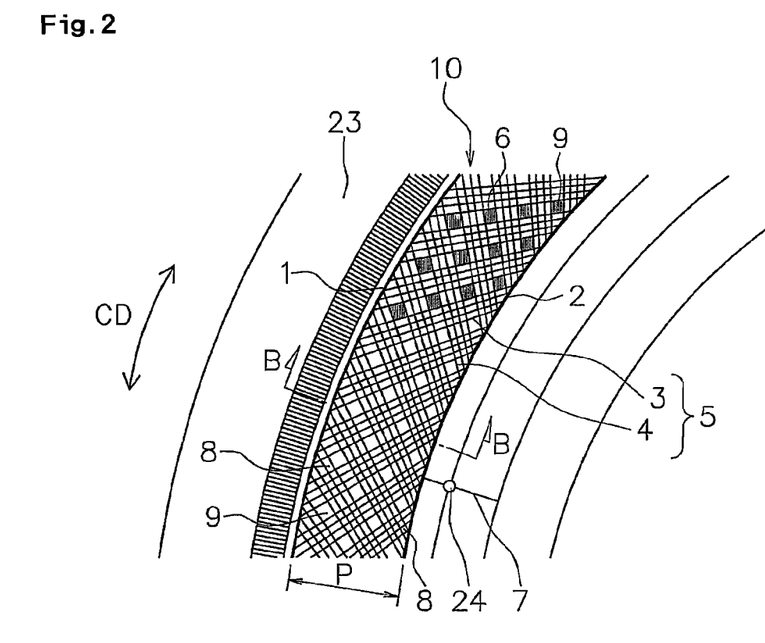
FIG. 2 is a plan view as seen from an arrow A in FIG. 1.

At a time of the cure molding, a tread surface of the tire is pressed to the inner surface 21, and the side surfaces of the tire are pressed to the inner surfaces 22 and 23. Groove-like saw cuts 10 are provided in an area of the tire molding surface 20 coming into contact with the side surfaces of the tire, that is, the inner surfaces 22 and 23 of the side mold portions M2 and M3. As shown in FIG. 2, the saw cut 10 includes a pair of circumferential saw cuts 1 and 2 which extend in a tire circumferential direction CD, a grid-like saw cut 5 which is constructed by a combination of saw cuts 3 and 4 arranged in an intersecting direction with each other, and a plurality of frame-like saw cuts 6. The saw cut 10 may be provided only in one side in a tire width direction (a vertical direction in FIG. 1).

Figure 3:
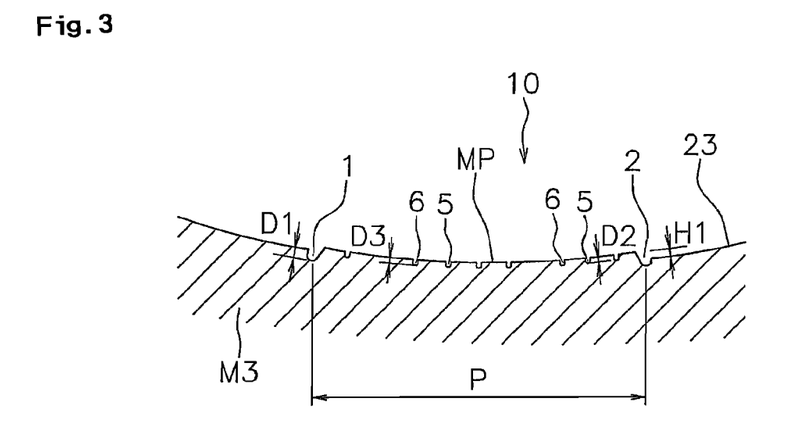
FIG. 3 is a cross sectional view as seen from an arrow B-B in FIG. 2.

The circumferential saw cuts 1 and 2 are arranged so as to be provided with a distance P in a tire diametrical direction, and form an annular band-like area. A vent hole 24 is set in a saw cut 7 which is communicated with the circumferential saw cut 2, however, may be set in the circumferential saw cuts 1 and 2 or in the band-like area. There is a case that a mark or a logo is displayed in the band-like area. As shown in FIG. 3, the band-like area is formed so as to slightly protrude from the inner surface 23, and a protruding height H1 is, for example, between 0.3 and 0.6 mm. The band-like area may be formed on the same surface as the inner surface 23 or a position which is concaved from the inner surface 23.

A depth D1 of the circumferential saw cut 1 on the basis of the inner surface 23 outside the band-like area is set, for example, between 0.5 and 1.2 mm. A depth of the circumferential saw cut 2 is the same as the above depth. The pair of circumferential saw cuts 1 and 2 are arranged so as to have a tire maximum width position MP therebetween, and the band-like area is positioned approximately at the center of the tire molding surface 20 in the tire diametrical direction, however, the circumferential saw cuts 1 and 2 may be arranged in an inner side in the tire diametrical direction than the tire maximum width position MP without being limited to the above. The width of the band-like area, that is, the distance P of the circumferential saw cuts 1 and 2 which is measured in the tire diametrical direction is preferably equal to or more than 15 mm, and is more preferably equal to or more than 25 mm.

Figure 4:
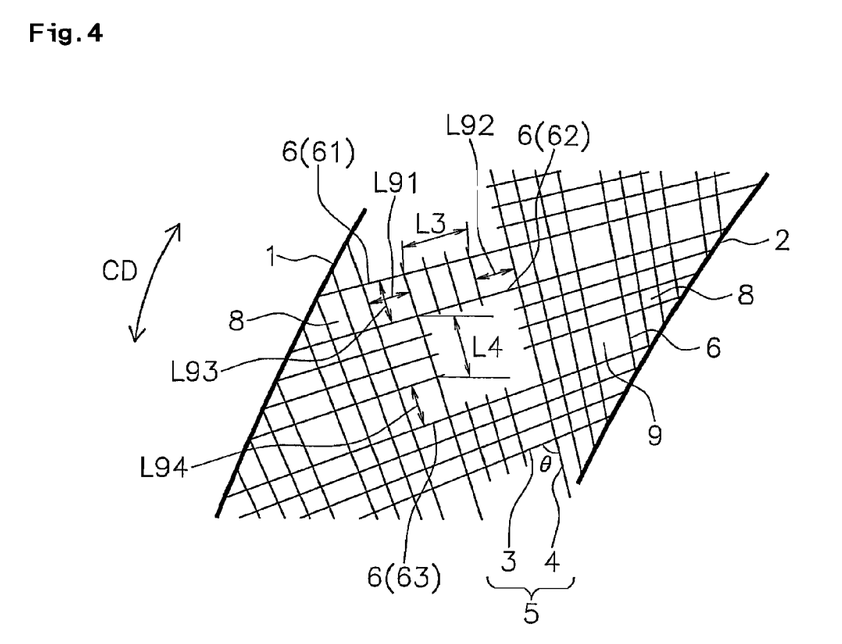
FIG. 4 is an enlarged view showing by extracting a part of saw cuts shown in FIG. 2.

As shown in FIG. 4 in an enlarged manner, the grid-like saw cut 5 is expanded like a grid between the pair of circumferential saw cuts 1 and 2 (that is, within the band-like area), and a smooth area 8 forming a mesh of the grid is defined by the grid-like saw cut 5. Each of the saw cuts 3 and 4 constructing the grid-like saw cut 5 is inclined in relation to the tire diametrical direction and extends in a direction of coupling the pair of circumferential saw cuts 1 and 2. An angle A of intersection between the saw cut 3 and the saw cut 4 is, for example, 90±15 degrees. In the present embodiment, the saw cuts 3 and 4 are constructed by a straight line; however, they can be constructed by a curve.

The frame-like saw cuts 6 are dotted between the pair of circumferential saw cuts 1 and 2 (that is, in the band-like area), and are provided at a plurality of positions in the tire circumferential direction CD and a plurality of positions in the tire diametrical direction over a whole periphery of the tire. The frame-like saw cut 6 has a quadrangular surface shape which laps over the grid-like saw cut 5, opposite sides thereof are constructed by a part of the saw cuts 3, and the other opposite sides are constructed by a part of the saw cuts 4. A depth D2 of the grid-like saw cut 5 and a depth D3 of the frame-like saw cut 6 are, for example, between 0.15 and 0.7 mm, preferably between 0.2 and 0.4 mm, and are smaller than the depth of the circumferential saw cuts 1 and 2 on the basis of the surface of the band-like area.

The frame-like saw cut 6 fringes a closed area 9 which is wider than the smooth area 8 defined by the grid-like saw cut 5. Accordingly, a lot of quadrangular closed areas 9 which do not include any saw cut are dotted in the band-like area. In FIG. 2, in order to easily discriminate on the drawing, the several closed areas 9 are colored with a dingy color. The surfaces of the smooth area 8 and the closed area 9 are formed smoothly along a curved surface of the band-like area; however, the surface may protrude in the closed area 9. An area of the closed area 9 is set, for example, to twice to eight-fold an area of the smooth area 8.

In the saw cut 10, the grid-like saw cuts 5 surround the frame-like saw cut 6 so as to prevent the frame-like saw cuts 6 from coming into contact with each other, and a plurality of smooth areas 8 are interposed between the frame-like saw cuts 6. Further, the frame-like saw cuts 6 are coupled to each other via the grid-like saw cuts 5. In the frame-like saw cuts 61 to 63 which are shown in FIG. 4 and do not come into contact with each other, the frame-like saw cut 61 and the frame-like saw cut 62 are coupled via a plurality of saw cuts 3, and the frame-like saw cut 61 and the frame-like saw cut 63 are coupled via a plurality of saw cuts 4.

In the mold TM, since the grid-like saw cuts 5 are provided between the pair of circumferential saw cuts 1 and 2, it is possible to disperse the rubber flowing direction in the band-like area at a time of cure molding. Further, since the rubber tends to be adhered in the closed area 9 in comparison with the peripheral area thereof, the rubber tends to stay locally here and there in the band-like area, and the flow of the rubber is not uniform. Further, since the frame-like saw cuts 6 do not come into contact with each other, this structure does not form an obstacle to expansion of the rubber over the band-like area. As a result, it is possible to prevent the air accumulation from being created by dispersing the air lying between the tire molding surface 20 and the side surface of the tire. As mentioned above, the mold TM disperses the air to such a degree that the air accumulation is not created, and does not aim at forcibly feeding the air to the vent hole.

The frame-like saw cut 6 is coupled to the other plurality of frame-like saw cuts 6 by the grid-like saw cut 5. A length of a line segment of the grid-like saw cut 5 coupling the frame-like saw cuts 6 is preferably between once and triple the length of the closed area 9 which is surrounded by the frame-like saw cuts 6, and the length of the closed area 9 is measured in a longitudinal direction of the line segment. Since the rate is equal to or more than once, a rubber fluidity can be secured without approximating the closed areas 9 with each other more than necessary. Further, since the rate is equal to or less than triple, the air can be effectively dispersed by appropriately approximating the closed areas 9 with each other so as to apply a sufficient change to the rubber flow.

Specifically, in FIG. 4, a length L3 of the line segment of the saw cut 3 coupling the frame-like saw cuts 61 and 62 is set to be between once and triple lengths L91 and L92 of the closed areas 9 which are surrounded by the frame-like saw cuts 61 and 62. Each of the lengths L91 and L92 is measured in a longitudinal direction of the line segment of the saw cut 3. In the same manner, a length L4 of a line segment of the saw cut 4 coupling the frame-like saw cuts 61 and 63 is set to be between once and triple lengths L93 and L94 of the closed areas 9 which are surrounded by the frame-like saw cuts 61 and 63. Each of the lengths L93 and L94 is measured in a longitudinal direction of the line segment of the saw cut 4.

Cross sectional shapes of the pair of circumferential saw cuts 1 and 2, the grid-like saw cut 5 and the frame-like saw cut 6 are not particularly limited, but can employ various shapes. In the case that the cross sectional shapes are formed as a shape which is narrowed in a depth direction, for example, a triangular shape, a trapezoidal shape or a semicircular shape, the shape is preferable since the saw cut can be worked without creating any undercut. In the case that the cross sectional shape of the saw cut is triangular, a leading end thereof is desirably formed by a small circular arc.

There is a case that small stripes extending in the tire circumferential direction CD are formed in the inner surfaces 22 and 23 of the side mold portions M2 and M3. The small stripes are formed by a machine work in a different step from a forming step of the saw cut 10, and have irregularity, for example, between several microns and ten and several microns. In the present embodiment, since the saw cuts 3 and 4 constructing the grid-like saw cut 5 extend in the directions respectively intersecting the tire circumferential direction CD, the saw cuts 3 and 4 intersect the small stripes mentioned above, whereby a flow channel of the air is increased.

Figure 5:
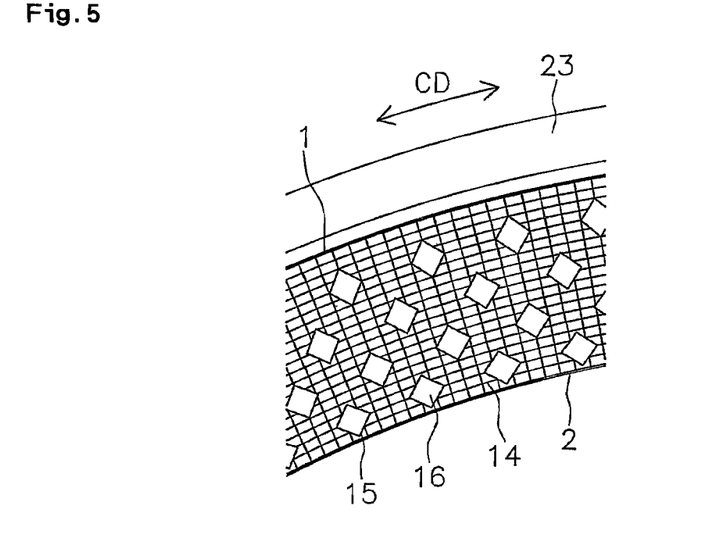
FIG. 5 is a plan view of saw cuts according to the other embodiment of the present invention.
Figure 6:
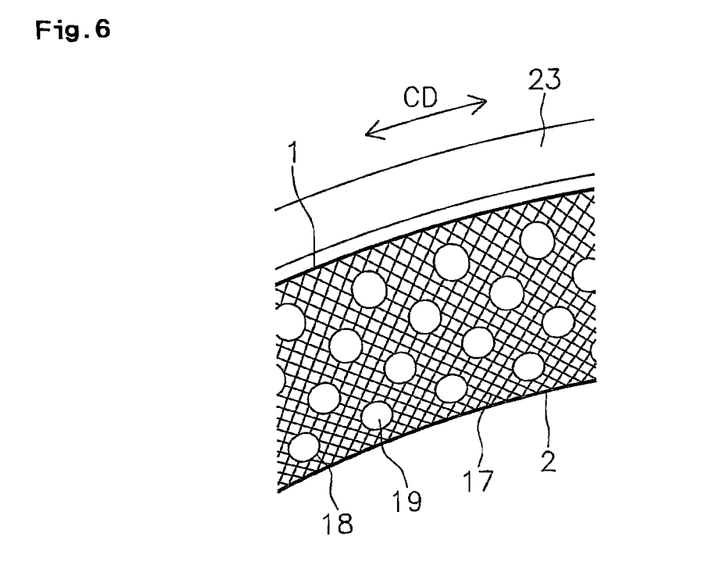
FIG. 6 is a plan view of saw cuts according to the other embodiment of the present invention.

The surface shape of the frame-like saw cut 6 is preferably formed as a polygonal shape having four or more sides or a circular shape. Accordingly, a direction of the rubber flow passing through the closed area 9 tends to be dispersed, thereby effectively preventing the air accumulation from being created. FIG. 5 shows an example which employs a grid-like saw cut 14 having a different layout from FIG. 2, and is structured such that a quadrangular frame-like saw cut 15 surrounds a closed area 16. The frame-like saw cut 15 extends in a direction which intersects both saw cuts constructing the grid-like saw cut 14. FIG. 6 shows an example which employs a grid-like saw cut 17 inclined in relation to the tire diametrical direction, and is structured such that a circular frame-like saw cut 18 surrounds a closed area 19.

In the saw cut 10 in FIG. 2, the closer to the inner side in the tire diametrical direction the closed area 9 is positioned, the smaller little by little the closed area 9 is, and the same applies to FIGS. 5 and 6. This is associated with a fact that the side surface of the uncured tire is pressed in advance in the outer side in the tire diametrical direction. A sufficient change can be applied to the flow of the rubber in the outer side in the tire diametrical direction which is pressed in advance, and the change applied to the flow of the rubber becomes smaller in the inner side in the tire diametrical direction which is pressed behind time. Therefore, a preferable change can be applied to the flow of the rubber without deteriorating the fluidity of the rubber so much. In the case that the side surface of the uncured tire is pressed in advance in the inner side in the tire diametrical direction, the closed area 9 may be made larger toward the positions closer to the inner side in the tire diametrical direction.

The mold TM mentioned above is structured in the same manner as the normal tire mold except the matter that the saw cut 10 as mentioned above is provided in the area of the tire molding surface which comes into contact with the side surface of the tire, and the conventionally known material, shape and structure can be applied to the present invention. Accordingly, for example, the tire molding surface 20 is constructed by three mold portions in the present embodiment; however, the tire molding surface may be constructed by a pair of mold portions which are divided into two sections at the center of the treat portion, in place of the above.

Next, a description will be given of a manufacturing method of a pneumatic tire according to the present invention. Since the manufacturing method can be carried out in the same manner as the conventional tire manufacturing steps except a step of cure molding the tire, a description will be given only of the cure molding step. The manufacturing method of the pneumatic tire has a step of cure molding the tire by using the mold TM which is provided with the saw cut 10 as mentioned above in the area of the tire molding surface which comes into contact with the side surface of the tire.

Figure 7:
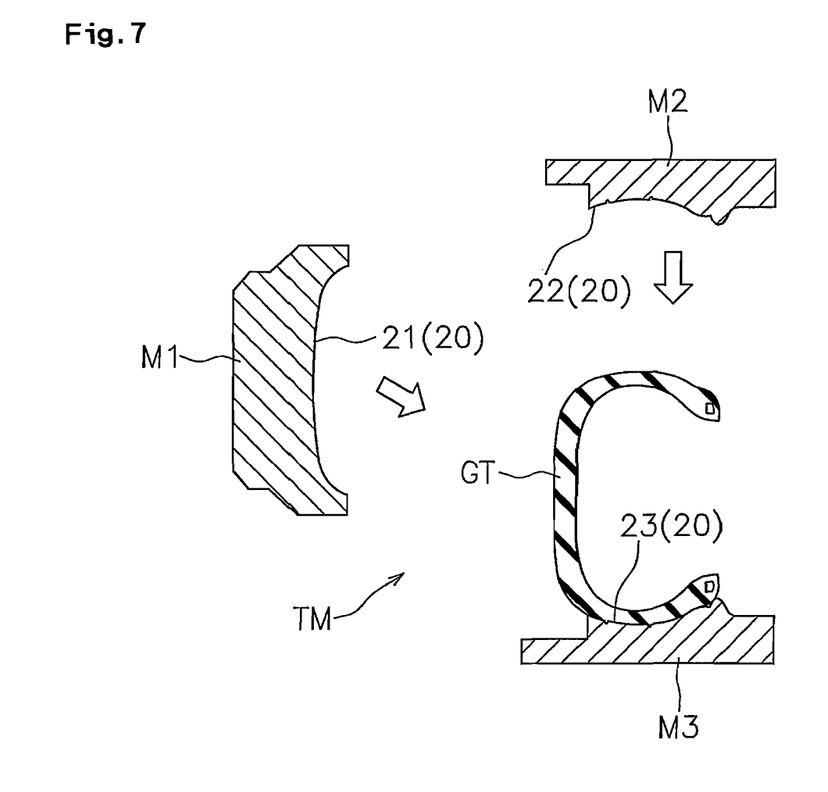
FIG. 7 is a cross sectional view showing a state in which an uncured tire is set to a tire mold.

In the cure molding step, after setting an uncured tire GT before cure molding as shown in FIG. 7, the mold TM is clamped as shown in FIG. 1. Further, in a state in which the tread surface and the side surfaces of the tire GT are pressed to the tire molding surface 20, the cure molding is carried out by applying a heating operation and a pressurizing operation to the tire GT. At this time, it is possible to prevent the air accumulation from being created by dispersing the air lying between the tire molding surface 20 (particularly the inner surfaces 22 and 23) and the side surfaces of the tire GT as mentioned above. As a result, it is possible to inhibit the recess from being formed due to the air accumulation, in the side surfaces of the cure molded tire.

Figure 8:
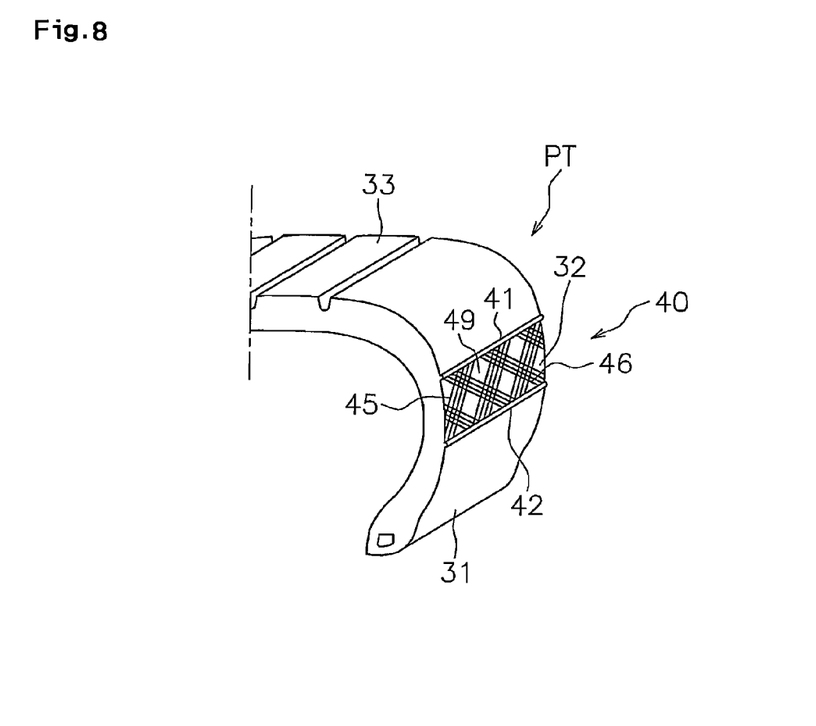
FIG. 8 is a perspective view schematically showing an example of a cure molded pneumatic tire.

FIG. 8 shows a pneumatic tire PT which is manufactured through the cure molding step as mentioned above. The pneumatic tire PT is provided with a side wall portion 32 which extends to an outer side in a tire diametrical direction from a bead portion 31 which seats on a rim, and a tread portion 33 which is connected to an outer end of the side wall portion 32 so as to construct the tread surface. The side surface of the tire PT is provided with a projection-like ridge 40 which protrudes out of an outer surface of the side wall portion 32. The tire PT has the same structure as the normal pneumatic tire except the provision of the ridge 40, and is provided in an inner portion thereof with a carcass and a belt which are not shown.

The ridge 40 includes a pair of circumferential ridges 41 and 42 which extend in a tire circumferential direction and are arranged so as to be spaced in a tire diametrical direction, a grid-like ridge 45 which is constructed by a combination of ridges arranged in directions intersecting with each other, and expands like a grid between the pair of circumferential ridges 41 and 42, and a plurality of frame-like ridges 46 which are dotted between the pair of circumferential ridges 41 and 42 and fringe a closed area 49 which is wider than a smooth area defined by the grid-like ridge 45. Further, in the ridge 40, the grid-like ridge 45 surrounds the frame-like ridge 46 in such a manner as to prevent the frame-like ridges 46 from coming into contact with each other, and the frame-like ridges 46 are coupled to each other via the grid-like ridge 45.

Since the ridge 40 is formed by transcription of the saw cut 10, a specific aspect of the ridge 40 can be supposed from FIG. 2. In other words, the circumferential ridges 41 and 42, the grid-like ridge 45 and the frame-like ridge 46 are respectively formed by the transcription of the circumferential saw cuts 1 and 2, the grid-like saw cut 5 and the frame-like saw cut 6, and the smooth area and the closed area correspond to the saw cut 10 in the same manner. In the tire PT, since the air accumulation is prevented from being created at a time of the cure molding as mentioned above, the recess is inhibited from being formed in the side surface.

The present invention is not limited to the embodiment mentioned above, but can be variously modified and changed within the scope of the present invention.

EXAMPLES

Figure 9A:
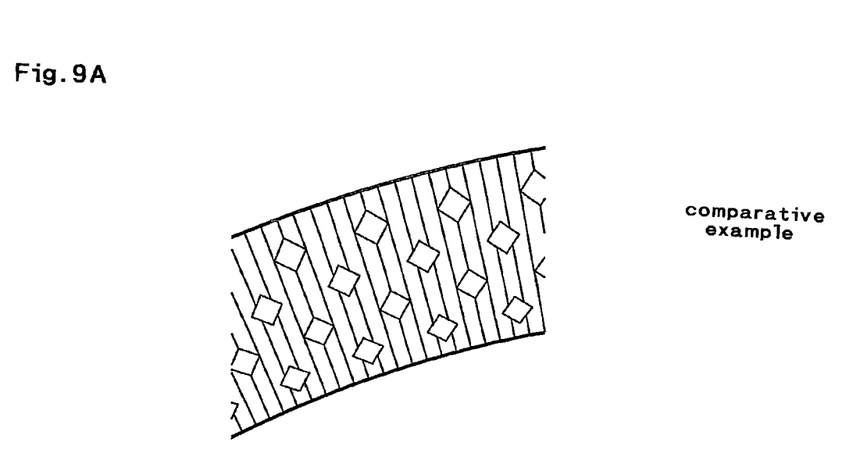
FIG. 9A is a view showing saw cuts according to Comparative Example 2.
Figure 9B:
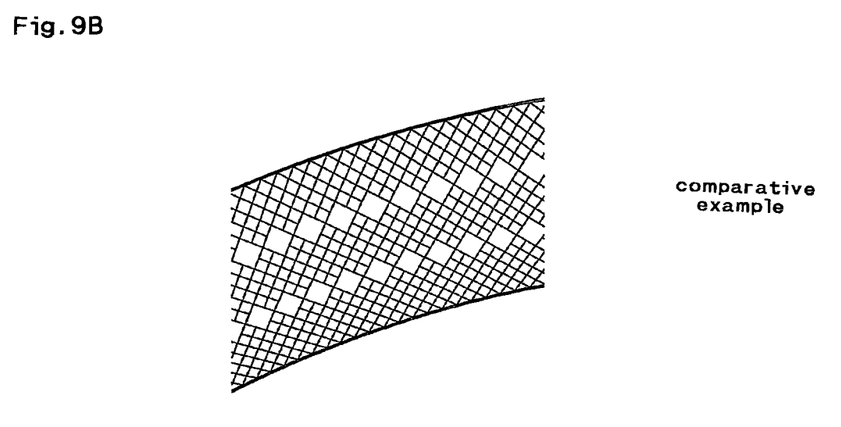
FIG. 9B is a view showing saw cuts according to Comparative Example 3.

By inspecting cure molded tires 100 by 100, a case that one or more tires which is determined as a defect bonding in a recess of a side surface exists was evaluated as "yes", and a case that no such tire exists was evaluated as "no". The size of the tire provided for evaluation is 196/65R15, and the structures of the tire molds in the respective examples are common except the shapes of the saw cuts. FIG. 9A shows an aspect of Comparative Example 2, and corresponds to an aspect obtained by adding the frame-like saw cut in FIG. 5 to the saw cut in FIG. 10. FIG. 9B shows an aspect of Comparative Example 3, and corresponds to an aspect obtained by connecting the frame-like saw cuts in the tire circumferential direction in the saw cut pattern as shown in FIG. 2.

TABLE 1

| | Comparative Example 1 | Comparative Example 2 | Comparative Example 3 | Working Example 1 | Working Example 2 |
|---|---|---|---|---|---|
| saw cut pattern | FIG. 10 | FIG. 9A | FIG. 9B | FIG. 5 | FIG. 2 |
| defect bonding | yes | yes | yes | no | no |

As shown in Table 1, in Comparative Examples 1 to 3, the tire which was determined to be as the defect bonding in the recess of the side surface was confirmed. It can be thought that the result was caused by the fact that in Comparative Examples 1 and 2, the effect of dispersing the rubber flowing direction was absent or small, and in Comparative Example 3, the rubber flow was blocked by the frame-like saw cuts which are in contact with each other. On the contrary, in Working Examples 1 and 2, no tire which is determined to be as the defect bonding in the recess of the side surface was confirmed.

What is claimed is:

1. A tire mold provided with a groove-shaped saw cut in an area of a tire molding surface which comes into contact with a side surface of a tire,
   wherein the saw cut comprises:
   a pair of circumferential saw cuts which extend in a tire circumferential direction and are arranged so as to be spaced in a tire diametrical direction;
   a grid-shaped saw cut which is constructed by a combination of intersecting saw cuts arranged in directions intersecting with each other, and extends in a grid-shaped pattern between the pair of circumferential saw cuts, the intersecting saw cuts defining smooth areas in the grid-shaped pattern; and
   a plurality of framing saw cuts framing closed areas which are dotted in a repeating pattern between the pair of circumferential saw cuts, each of the closed areas being wider than each of the smooth areas, and
   wherein the grid-shaped saw cut surrounds the framing saw cuts in such a manner as to prevent the framing saw cuts from coming into contact with each other, and the framing saw cuts are coupled to each other via the grid-shaped saw cut.

2. The tire mold according to claim 1, wherein a length of a line segment of the grid-shaped saw cut coupling the framing saw cuts is between once and triple a length in a longitudinal direction of a line segment of the closed areas framed by the framing saw cuts.

3. The tire mold according to claim 1, wherein a surface shape of each of the closed areas is formed as a polygonal shape having four or more sides or having a circular shape.

4. The tire mold according to claim 1, wherein the closed area becomes smaller or larger toward a position close to an inner side in the tire diametrical direction.

5. The tire mold according to claim 1, wherein an annular band-shaped area formed by the pair of circumferential saw cuts is formed so as to protrude from the tire molding surface.

* * * * *